US012694270B2

(12) United States Patent
He et al.

(10) Patent No.:     US 12,694,270 B2
(45) Date of Patent:         Jul. 28, 2026

(54) TRAINING DETECTION MODEL USING OUTPUT OF LANGUAGE MODEL APPLIED TO EVENT INFORMATION

(71) Applicant: Maplebear Inc., San Francisco, CA (US)

(72) Inventors: Ze He, Sunnyvale, CA (US); Dian Ding, Santa Clara, CA (US); Hechao Sun, Mountain View, CA (US)

(73) Assignee: Maplebear Inc., San Francisco, CA (US)

( * ) Notice: Subject to any disclaimer, the term of this patent is extended or adjusted under 35 U.S.C. 154(b) by 569 days.

(21) Appl. No.: 18/210,553

(22) Filed: Jun. 15, 2023

(65) Prior Publication Data

US 2024/0419941 A1     Dec. 19, 2024

(51) Int. Cl.
| | |
|---|---|
| *G06N 3/045* | (2023.01) |
| *G06N 3/084* | (2023.01) |
| *G06Q 10/087* | (2023.01) |
| *G06Q 20/40* | (2012.01) |
| *G06Q 30/0601* | (2023.01) |

(52) U.S. Cl.
CPC ............. *G06N 3/045* (2023.01); *G06N 3/084* (2013.01); *G06Q 10/087* (2013.01); *G06Q 20/407* (2013.01); *G06Q 30/0637* (2013.01)

(58) Field of Classification Search
CPC ...... G06N 3/045; G06N 3/084; G06Q 10/087; G06Q 20/407; G06Q 30/0637
See application file for complete search history.

(56) References Cited

U.S. PATENT DOCUMENTS

| | | | | |
|---|---|---|---|---|
| 10,810,592 | B1 * | 10/2020 | Omojola ............ | G06Q 30/0637 |
| 11,922,495 | B1 * | 3/2024 | Hernandez ............. | G06Q 40/03 |
| 2022/0230173 | A1 * | 7/2022 | Sumpter ................... | G06T 7/62 |
| 2022/0309516 | A1 * | 9/2022 | Rhoads .................... | G06N 5/01 |
| 2022/0383242 | A1 * | 12/2022 | Wright .............. | G06Q 10/0832 |
| 2024/0265205 | A1 * | 8/2024 | Goligorsky ........... | G06F 40/205 |

* cited by examiner

*Primary Examiner* — Oleg Korsak
(74) *Attorney, Agent, or Firm* — Fenwick & West LLP

(57)         ABSTRACT

Embodiments relate to an automatic detection of fraudulent behavior for a transaction at an online system. The online system requests a large language model (LLM) to determine, based on a prompt input into the LLM, information about a refund event for a first order placed by a user of the online system. The online system accesses a computer model trained to detect a fraudulent behavior associated with an order placed with the online system. The online system applies the computer model to determine a score associated with the refund event, based on the information about the refund event received from the LLM. The online system determines, based on the score, whether the refund event was due to a fraudulent behavior of the user. The online system performs at least one action associated with the online system, based on the determination whether the refund event was due to the fraudulent behavior.

20 Claims, 5 Drawing Sheets

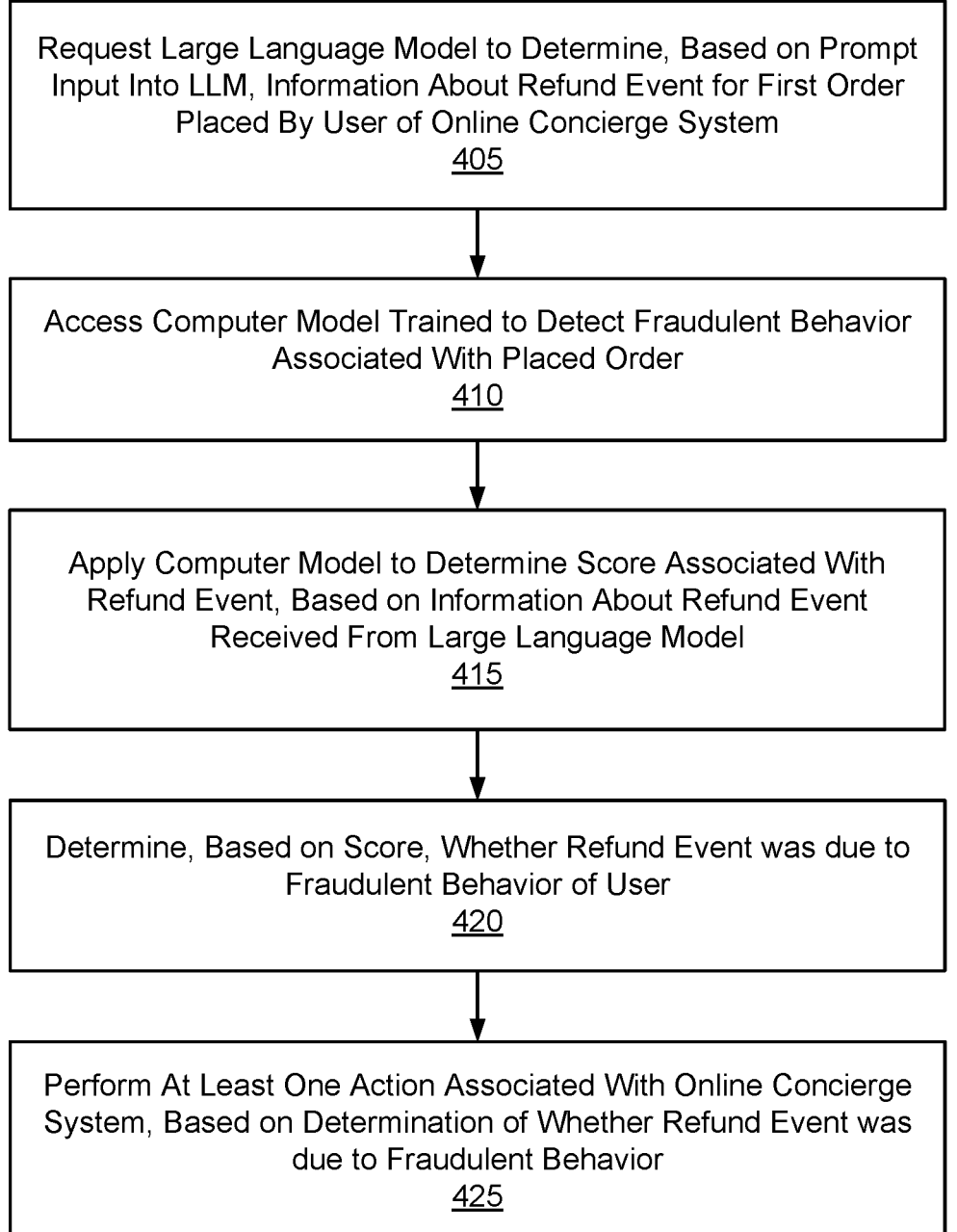

Request Large Language Model to Determine, Based on Prompt Input Into LLM, Information About Refund Event for First Order Placed By User of Online Concierge System
405

Access Computer Model Trained to Detect Fraudulent Behavior Associated With Placed Order
410

Apply Computer Model to Determine Score Associated With Refund Event, Based on Information About Refund Event Received From Large Language Model
415

Determine, Based on Score, Whether Refund Event was due to Fraudulent Behavior of User
420

Perform At Least One Action Associated With Online Concierge System, Based on Determination of Whether Refund Event was due to Fraudulent Behavior
425

FIG. 4

TRAINING DETECTION MODEL USING OUTPUT OF LANGUAGE MODEL APPLIED TO EVENT INFORMATION

BACKGROUND

Online systems, such as online concierge systems, give refunds to customers for various reasons, including when there is at least one item in an order that was not included due to being out-of-stock (OOS). If an item is labeled as an OOS item, this typically leads to a replacement and/or refund event. For example, some large orders may be refunded in full if only one or two items are labeled as OOS (i.e., not found). Thus, it is important to determine whether a refund event is legitimate or due to a fraudulent behavior, i.e., whether a particular item is truly OOS or not. However, current approaches for determining whether refund events are legitimate do not provide consistent results. Specifically, inputs with relatively poor features are typically provided to a fraud model, thus causing false positives and false negatives in relation to potential fraudulent behaviors associated with orders placed with an online concierge system. The inputs with poor features are commonly related to various refund sources (e.g., pickers and customer care service) and various refund reasons (e.g., pre-coded standardized refund reasons) that are often not reliable and/or not OOS related.

SUMMARY

Embodiments of the present disclosure are directed to training a fraud detection model (e.g., machine-learning computer model) using an output of a language model (e.g., large language model) applied to transaction data (e.g., refund event for an order) to automatically detect a fraudulent behavior in relation to a transaction (e.g., refund event) at an online concierge system.

In accordance with one or more aspects of the disclosure, an online concierge system requests a large language model (LLM) to determine, based on a prompt input into the LLM, information about a refund event for a first order placed with an online concierge system by a user of the online concierge system. The online concierge system accesses a computer model of the online concierge system trained to detect a fraudulent behavior associated with an order placed with the online concierge system. The online concierge system applies the computer model to determine a score associated with the refund event, based on the information about the refund event received from the LLM. The online concierge system determines, based on the score, whether the refund event was due to a fraudulent behavior of the user. The online concierge system performs at least one action associated with the online concierge system, based on the determination of whether the refund event was due to the fraudulent behavior.

BRIEF DESCRIPTION OF THE DRAWINGS

FIG. 4 is a flowchart of a method of automatically detecting fraudulent behavior of a user of an online concierge system, in accordance with one or more embodiments.

DETAILED DESCRIPTION

Figure 1A:
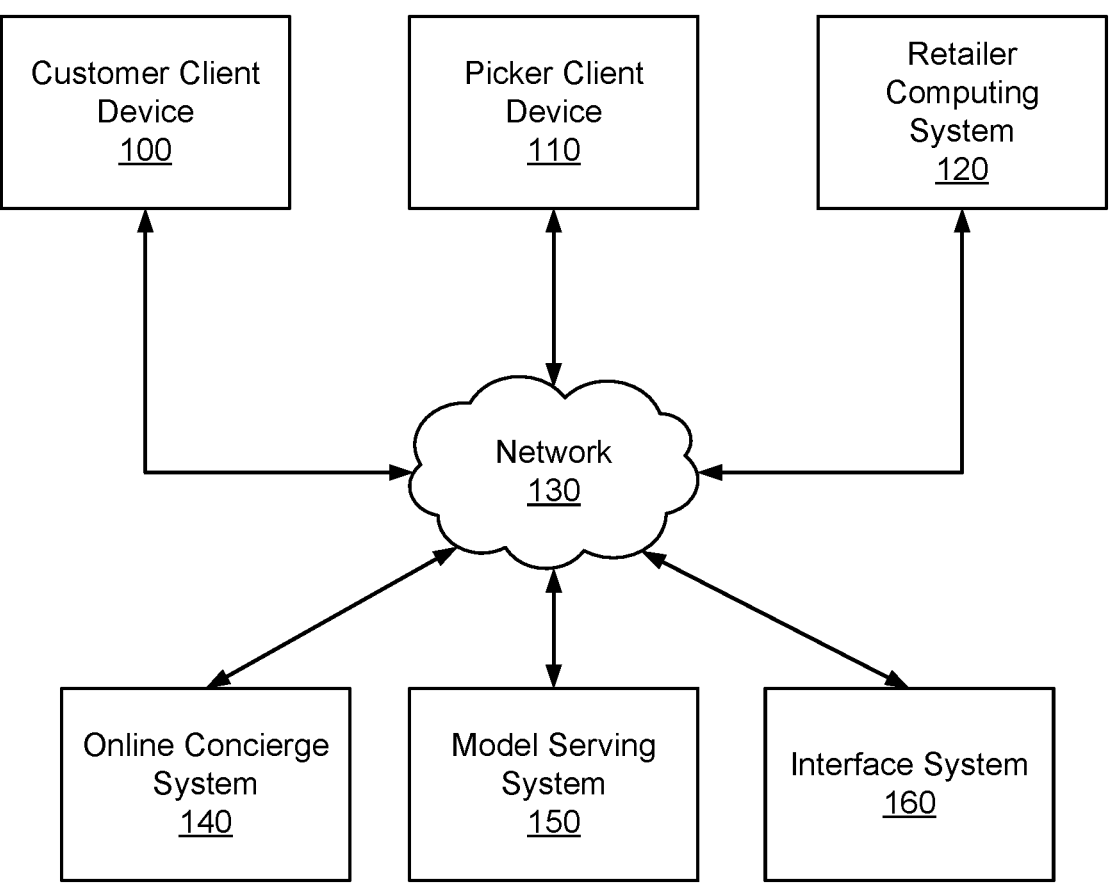
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks.

An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In accordance with one or more embodiments, the online concierge system 140 allows customers of the online concierge system 140 to create orders, which are then picked and delivered by pickers (i.e., shoppers). If there is a problem with an order placed with the online concierge system 140 (e.g., one or more missing items), the online concierge system 140 may refund all or part of the order's cost to a customer that placed that particular order. The online concierge system 140 uses a computer model (e.g., machine-learning model) trained to predict whether a specific refund event was based on a fraudulent behavior. To improve a quality of result generated by the computer model, the online concierge system 140 prompts the LLM of the model serving system 150 to generate a reliable explanation of why the specific refund event occurred, i.e., whether the refund event is due to an out-of-stock (OOS) event, an item is found but the refund is made due to other reasons, or the refund event is made due to a fraudulent behavior. The response from the LLM of the model serving system 150 can be then used as an input for the computer model of the online concierge system 140. In this manner, the online concierge system 140 leverages the LLM to improve a prediction of a fraudulent behavior at the online concierge system 140.

The online concierge system 140 prepares a prompt for input to the LLM of the model serving system 150. The prompt may include a transcript of a chat conversation between a customer and a picker during a picking (i.e., shopping) process, a transcript of a chat conversion between the customer and a customer service of the online concierge system 140, notes from the customer service associated with the chat conversion with the customer, an image copy of a receipt (e.g., scanned receipt or optical character recognition (OCR) version of the receipt) for an order placed by the customer, one or more requests (e.g., questions) for the LLM to classify a reason for a refund event associated with the order, one or more coded reasons for the refund event provided by the picker, any other useful information associated with the order, or some combination thereof. The prompt for input to the LLM may be a multimodal and include both textual data and image data associated with the order. Thus, the LLM of the model serving system 150 may be configured as a multi-modality LLM that can receive as inputs both textual data and image data.

An example prompt for input to the LLM of the model serving system 150 may include a following transcript of a chat conversion between a picker and a customer of the online concierge system 140 that is made during a picking process.

---

Picker: Hi Cynthia! This is Bernice, your shopper. I'm just getting started on your shopping list. If you have any updates or additions to your order, feel free to message me and I'll do my best to make it happen. If I am unable to find anything, I will reach out to you immediately.

Picker: They only have smaller packs of thighs, is that okay?

Customer: Hi, sure I can take two please.

Picker: Yes.

Picker: Would you like the regular flavor for barbecue or any other?

Picker: Or should I just refund if they don't have the teriyaki?

Picker: I will go ahead and refund for you just to be on the safe side, checking out now.

Picker: Just dropped off your order, thank you again Cynthia and have a good night.

---

The example prompt for input to the LLM of the model serving system 150 may further include the following task requests.

---

That was the transcript of a conversation between a customer and a picker who fulfilled the customer's order. Can you classify each item in the conversation into one of the following categories: <refund>, <replacement>, <found>? Can you find a refund amount or accepted replacement, if any? If an item was not available, and the customer did not accept what picker offered as a replacement, then it is <refund>. If there is no confirmation for delivery of an order, then the order was canceled. Also, please answer the following questions based on the context: (1) What was the final status of the order, classify it into one of the following categories <delivered>, <canceled>? Who started the conversation between the customer and the picker? What replacement recommendations were given by the picker, and for what item ordered? What is the reason the order was canceled, if applicable? What is the reason some items were replaced, if applicable? What is the reason some items were refunded, if applicable? Can you classify the major concerns from the transcript into one of the following categories: <item unavailability>, <replacement unacceptable>, <order canceled>?

---

The online concierge system 140 receives a response to the prompt from the model serving system 150 based on execution of the machine-learned model using the prompt. The response includes a first indication (e.g., binary indication, such as "Yes" or "No" answer) on whether the refund event is a real OOS label. If the response indicates that the refund event is not a real OOS label, the response can further include a second indication (e.g., "Yes", "No", or "cannot determine" answer) on whether the refund event is due to a fraudulent behavior. The online concierge system 140 may use the response to retrain (or more generally "update") an algorithm executed at the online concierge system 140 that generates the prompt for the LLM.

The online concierge system 140 imports the response from the model serving system 150 and uses the response as an input to one or more computer models (e.g., one or more machine-learning models) of the online concierge system 140. The response can be utilized for both inference and training of the one or more computer models. One computer model of the online concierge system 140 that uses the response may be trained to detect a fraudulent behavior associated with an order placed with the online concierge system 140. If the fraudulent behavior is detected, the online concierge system 140 may send a flag signal to a specific service of the online concierge system 140 for review of the customer's behavior and potential account suspension. Another computer model of the online concierge system 140 that uses the response may be trained to determine that an item associated with a refund event is truly OOS. In such case, the online concierge system 140 may appropriately update a label of the item in the database. Alternatively, the online concierge system 140 may send a signal via the network 130 to the retailer computing system 120 so that a corresponding retailer would update a label of the item in a catalog of the retailer.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
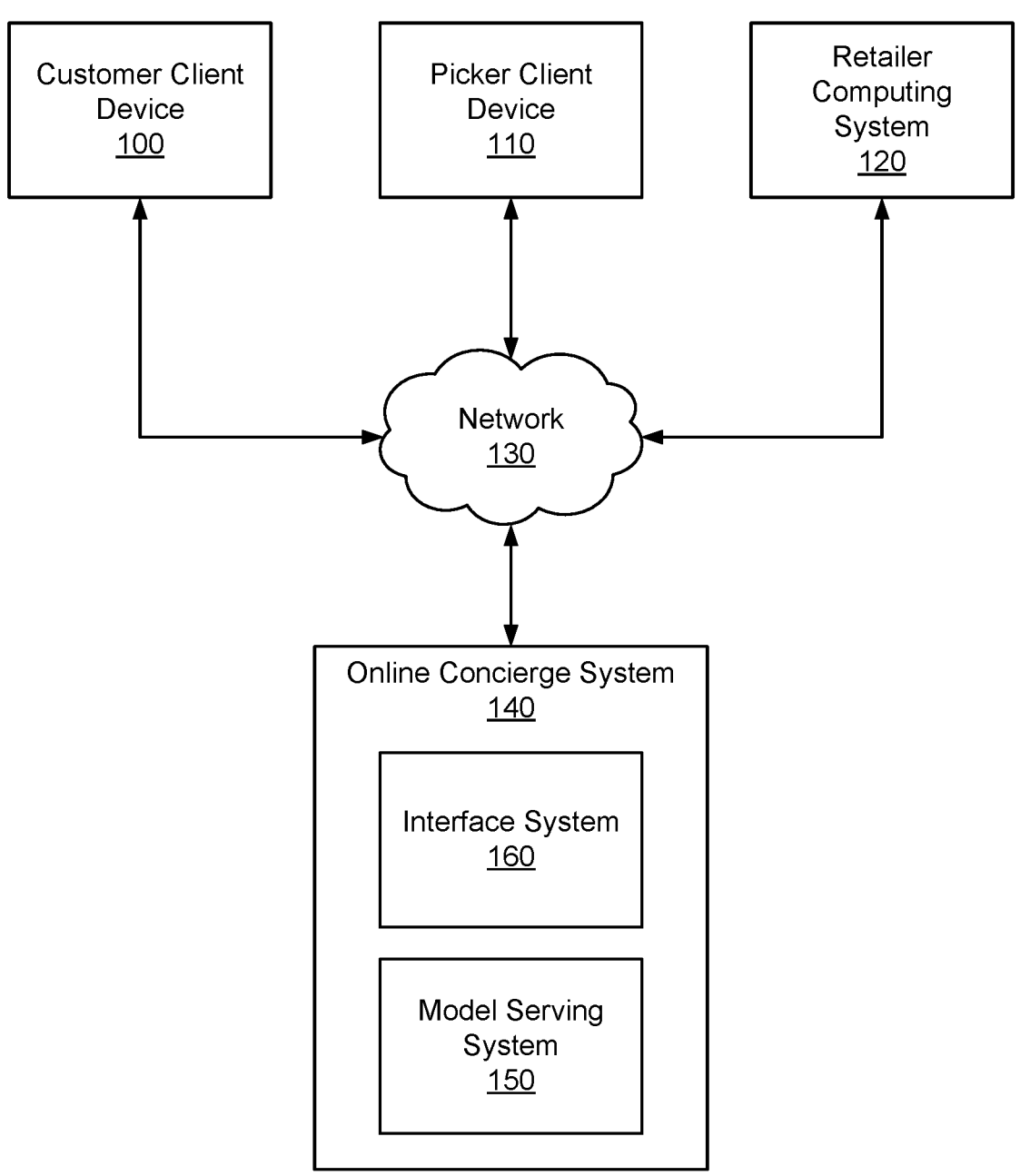
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140.

Figure 2:
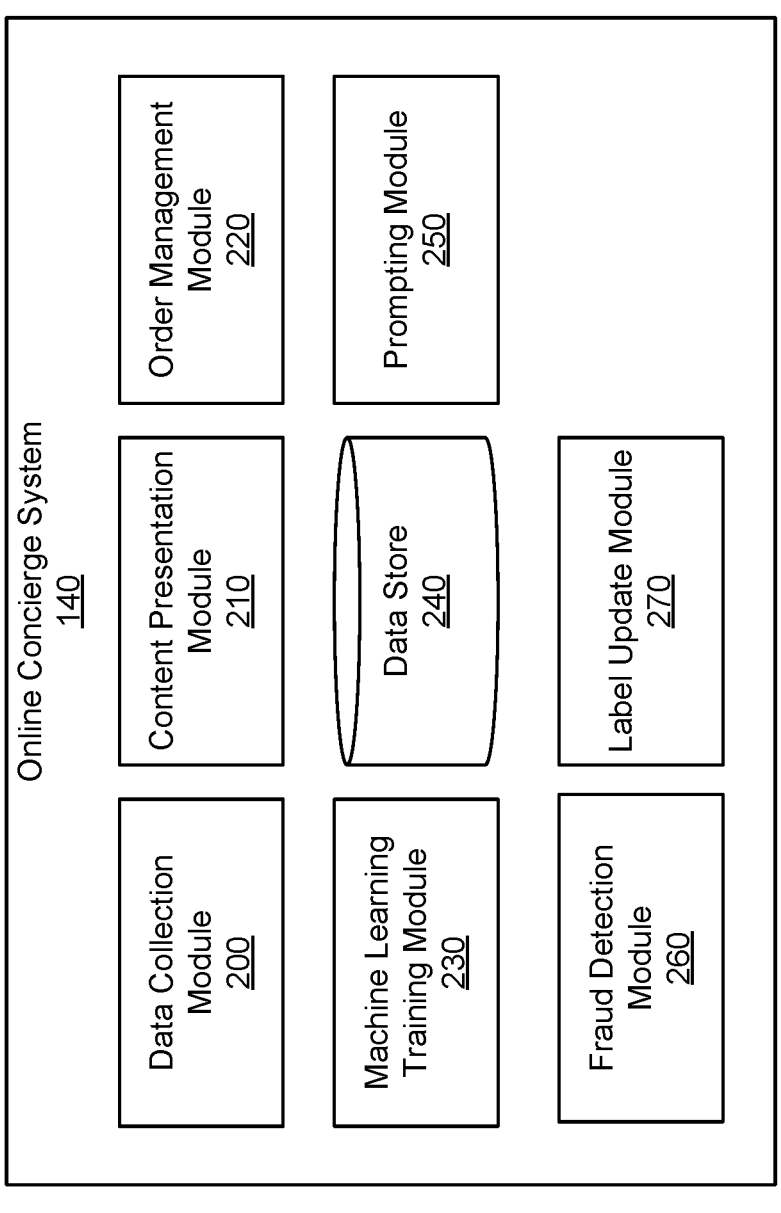
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a prompting module 250, a fraud detection module 260, and a label update module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine learning module 230 may train the item selection model, the availability model, or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In another embodiment, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The prompting module 250 generates a prompt for input into a LLM (e.g., the LLM of the model serving system 150) for generating information about a refund event for an order placed with the online concierge system 140 by a customer of the online concierge system 140. The prompt generated by the prompting module 250 may include a transcript of a chat conversation between the customer and a picker associated with the online concierge system 140 (e.g., available at the data store 240), a transcript of a chat conversion between the customer and a customer service of the online concierge system 140 (e.g., available at the data store 240), notes from the customer service associated with the chat conversion with the customer (e.g., available at the data store 240), an image of a receipt (e.g., scanned receipt or OCR version of the receipt) for the order (e.g., available at the data store 240), one or more requests (e.g., questions) for the LLM to classify a reason for the refund event, one or more coded reasons for the refund event provided by the picker, any other useful information associated with the order, or some combination thereof.

The fraud detection module 260 receives a response from the LLM that includes the information about the refund event, and determines, based on the information about the refund event, whether the refund event was due to a fraudulent behavior of the customer. The information about the refund event provided to the fraud detection module 260 may include an indication (e.g., binary indication, such as "Yes" or "No" answer) of whether the refund event is due to a true OOS label of one or more items associated with the order. If the refund event is not due to an OOS event, the information about the refund event provided to the fraud detection module 260 may further include another indication (e.g., "Yes", "No", or "cannot determine" answer) of whether the refund event is due to a fraudulent behavior. Alternatively or additionally, the information about the refund event may include a list of items associated with the refund event, one or more features for each item in the list (e.g., price tag, brand, etc.), and a textual description of at least one reason for the refund event. In one or more embodiments, the prompting module 250 can utilize the information about the refund event generated by the LLM to adjust an algorithm that generates the prompt for the LLM.

The fraud detection module 260 may deploy a computer model that is trained (e.g., via the machine learning training module 230) to detect a fraudulent behavior associated with a refund event for an order placed with the online concierge system 140. The computer model deployed by the fraud detection module 260 may run a machine-learning algorithm to determine a score associated with the refund event, based on the information about the refund event received from the LLM. The score determined by the computer model may be an indication of a likelihood that the refund event is due to a fraudulent behavior. For example, a higher value of the score may indicate a higher likelihood that the refund event is due to the fraudulent behavior, and vice versa. A set of parameters for the trained computer model may be stored on one or more non-transitory computer-readable media of the fraud detection module 260. Alternatively, the set of parameters for the computer model may be stored on one or more non-transitory computer-readable media of the data store 240.

The fraud detection module 260 determines, based on the score, whether the refund event was due to a fraudulent behavior of the customer. For example, the fraud detection module 260 may determine that the refund event was due to the fraudulent behavior, when the score is greater than or equal to a threshold score; and the fraud detection module 260 may determine that the refund event was not due to the fraudulent behavior, when the score is less than the threshold score. The machine learning training module 230 may retrain the computer model deployed by the fraud detection module 260 to adjust over time the threshold score for a fraudulent behavior.

When the fraud detection module 260 determines, based on the score, that the refund event was due to a fraudulent behavior of the customer, the fraud detection module 260 may trigger an appropriate action in relation to the customer. For example, the fraud detection module 260 may initiate a temporary or permanent suspension of the customer's account at the online concierge system 140. Additionally, in such case, the fraud detection module 260 may send a signal to the label update module 270 with a request to update at least one label of at least one item associated with the refund event if the at least one item was erroneously labeled as OOS when the refund event was actually due to the fraudulent behavior. When the fraud detection module 260 determines, based on the score, that the refund event was not due to a fraudulent behavior, the fraud detection module 260 may generate a signal for the label update module 270 to trigger updating of one or more labels of one or more items associated with the refund event. The signal generated by the fraud detection module 260 may represent an indication that the refund event is due to the fact that the one or more items associated with the refund event are actually OOS at a specific retailer.

The label update module 270 updates a label of an item associated with a refund event. In one or more embodiments, the label update module 270 updates the label of the item based on a signal from the fraud detection module 260 indicating that the refund event is not due to a fraudulent behavior, but rather due to the item being OOS at a specific retailer. In such cases, the label update module 270 may update the label of the item in the data store 240 to indicate that the item is OOS at the specific retailer. Alternatively or additionally, the label update module 270 may send a signal to a corresponding retailer with a request to update a label of the item in a catalog of the retailer to indicate that the item is OOS. In one or more other embodiments, the label update module 270 updates a label of an item associated with a refund event based on a signal from the fraud detection module 260 indicating that the refund event is due to a fraudulent behavior. In such cases, the label update module 270 may update the label of the item in the data store 240 to correct an erroneous label that indicates that the item is OOS when in fact the item is available.

In some embodiments, the label update module 270 may deploy a computer model trained to determine a likelihood that an item is OOS. The computer model deployed by the label update module 270 may run a machine-learning algorithm to determine a score associated with an item, based on information about the refund event received from the LLM (i.e., the response from the LLM). The score determined by the computer model may be an indication of a likelihood that the item is OOS. For example, a higher value of the score may indicate a higher likelihood that the item is OOS, and vice versa. Based on a score provided by the computer model that is greater than a threshold score, the label update module 270 may update a label associated with the item in the data store 240 to indicate that the item is OOS at a specific retailer. Alternatively or additionally, the label update module 270 may send a signal to a corresponding retailer with a request to update a label of the item in a catalog of the retailer to indicate that the item is OOS. A set of parameters for the trained computer model may be stored on one or more non-transitory computer-readable media of the label update module 270. Alternatively, the set of parameters for the computer model may be stored on one or more non-transitory computer-readable media of the data store 240.

Figure 3:
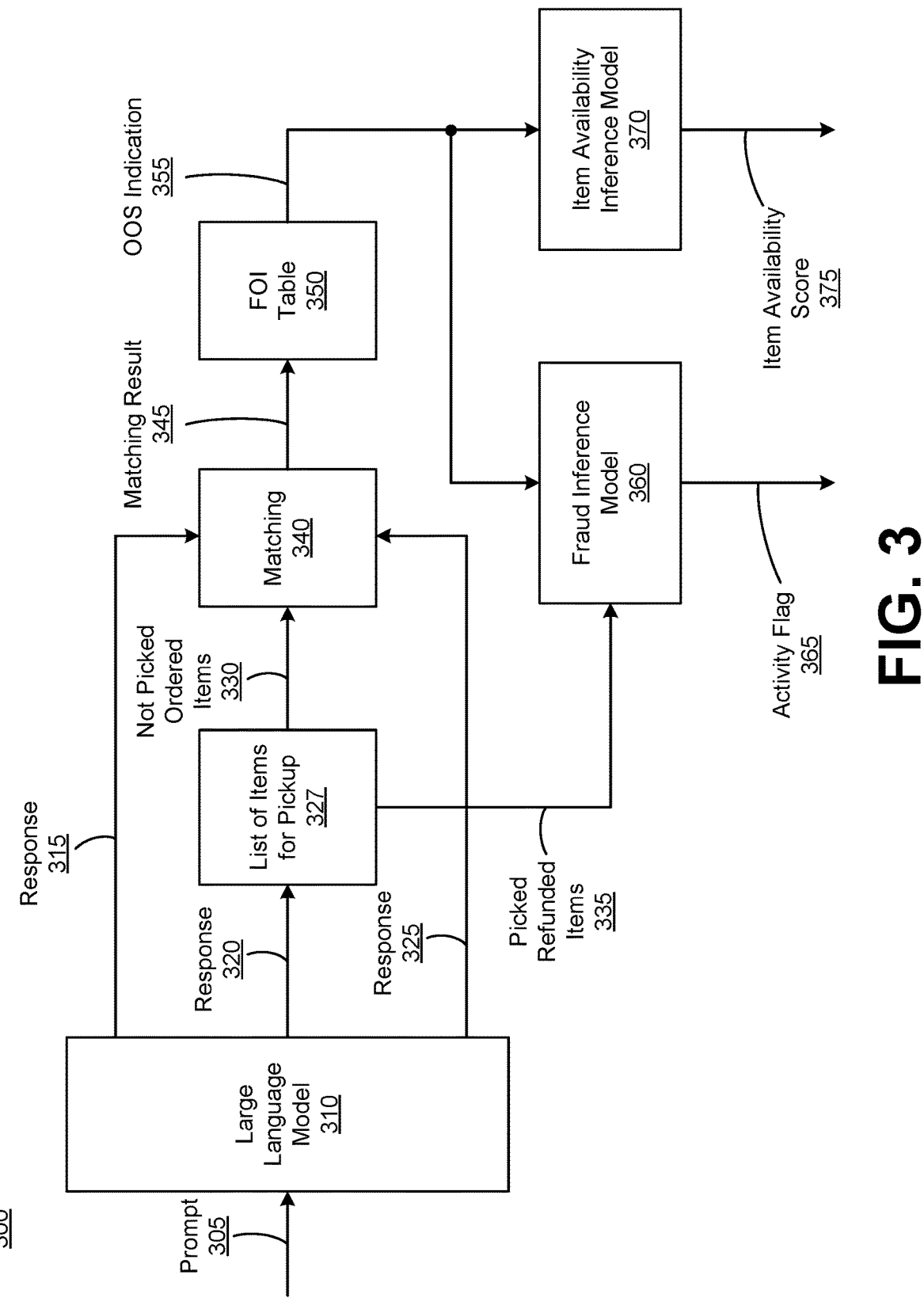
FIG. 3 illustrates an example flow of operations for fraud detection and items availability determination at an online concierge system, in accordance with one or more embodiments.

FIG. 3 illustrates an example flow 300 of operations for fraud detection and items availability determination at the online concierge system 140, in accordance with one or more embodiments. The example flow 300 starts with inputting a prompt 305 into an LLM 310. In some embodiments, the LLM 310 is part of the model serving system 150 that is separate from the online concierge system 140. In some other embodiments, the LLM 310 is part of the online concierge system 140. The prompt 305 may be generated by, e.g., the prompting module 250. The prompt 305 may include a transcript of a chat conversation between a customer and a picker during a picking (i.e., shopping) process, a transcript of a chat conversion between the customer and a customer service of the online concierge system 140, notes from the customer service associated with the chat conversion with the customer, an image copy of a receipt (e.g., scanned receipt or OCR version of the receipt) for an order placed by the customer, one or more requests (e.g., questions) for the LLM 310 to classify a reason for a refund event associated with the order, one or more coded reasons for the refund event provided by the picker, any other useful information associated with the order, or some combination thereof. The prompt 305 for input to the LLM 310 may be a multimodal and include both textual data and image data associated with the order. Thus, the LLM 310 may be configured as a multi-modality LLM that can receive as inputs both textual data and image data.

Based on the prompt 305 input into the LLM 310, the LLM 310 may generate responses 315, 320 and 325. Although FIG. 3 illustrates the LLM 310 generating three separate responses, it should be understood that the LLM 310 can alternatively generate more or fewer responses that cumulatively include the same information as the responses 315, 320 and 325. The response 315 may include information about one or more refunded/replaced items associated with the order and at least one reason provided by the picker for the refund event. The response 320 may include information about one or more identified attributes of each picked item (e.g., a brand, price, etc.). The response 325 may include information about one or more refunded items and information about at least one reason for the refund event provided by the customer service (e.g., derived from a chat between the customer service and a customer and from notes of the customer service).

The response 320 (i.e., the information about one or more identified attributes of each picked item) may be matched with a list of items for pickup 327 associated with the order. The list of items for pickup 327 and their status (e.g., "picked" or "not picked") may be available at, e.g., the data store 240. One result of matching the response 320 with the list of items for pickup 327 may be a list of not picked ordered items 330. Another result of matching the response 320 with the list of items for pickup 327 may be a list of picked refunded items 335 (if any). At 340, the response 315 (i.e., the information about one or more refunded/replaced items associated with the order and at least one reason provided by the picker for the refund event) and the response 325 (i.e., the information about one or more refunded items and information about at least one reason for the refund event provided by the customer service) may be matched with the list of not picked ordered items 330 to obtain a matching result 345 that is validated with items from a fact order item (FOI) table 350 to obtain an OOS indication 355. The FOI table 350 may be available at, e.g., the data store 240, and may further include one or more reasons for the refund event provided by the picker and/or the customer service. The OOS indication 355 may include an indication (e.g., binary flag) of whether each item associated with the refund event is OOS or not.

A machine-learning algorithm of a fraud inference model 360 may be applied to the OOS indication 355 and the list of picked refunded items 335 (if any) to generate an activity flag 365 that triggers a corresponding action at the online concierge system 140. The fraud inference model 360 may be trained to detect a fraudulent behavior associated with the placed order. When the fraud inference model 360 determines that no fraudulent behavior occurred (e.g., at least one item is OOS), the activity flag 365 may trigger a final approval for a whole order refund or a final approval for a partial (e.g., per-item) refund. When the fraud inference model 360 determines that the fraudulent behavior actually occurred, the activity flag 365 may trigger one or more actions in relation to an offending account, such as a recommendation for temporary suspension of the offending account, recommendation for permanent suspension of the offending account, recommendation of additional review of purchasing activities for a customer associated with the offending account, etc. The fraud inference model 360 may be an embodiment of the computer model deployed by the fraud detection module 260.

A machine-learning algorithm of an item availability inference model 370 may be applied to the OOS indication 355 to determine an item availability score for each item associated with the refund event. The item availability inference model 370 may be trained to determine a likelihood that a corresponding item is OOS. For example, an item availability score 375 that is higher than a threshold score may indicate a high likelihood that the corresponding item is available at a retailer. Similarly, an item availability score 375 that is less than the threshold score may indicate a high likelihood that the corresponding item is not available at the retailer (i.e., a high likelihood that the corresponding item is OOS). The item availability score 375 may be utilized by the label update module 270 to trigger an appropriate action in relation to a label of the corresponding item. The item availability inference model 370 may be an embodiment of the computer model deployed by the label update module 270.

FIG. 4 is a flowchart of a method of automatically detecting fraudulent behavior of a user, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 requests 405 (e.g., via the prompting module 250) a LLM (e.g., LLM of the model serving system 150) to determine, based on a prompt input into the LLM, information about a refund event for a first order placed with the online concierge system 140 by a user of the online concierge system 140. The online concierge system 140 may generate (e.g., via the prompting module 250) the prompt for input into the LLM. In one or more embodiments, the prompt comprises at least one of an image of a receipt associated with the first order or an optical character recognition version of the image of the receipt. In one or more other embodiments, the prompt comprises at least one of: a transcript of a conversation between a picker of the online concierge system 140 and the user, a transcript of a conversation between a user service of the online concierge system 140 and the user, a coded reason from the picker for the refund event, a request for classification of a reason for the refund event, or an image of a receipt associated with the first order. The LLM may be a multi-modal LLM configured to operate based on the prompt comprising textual data and image data.

The online concierge system 140 accesses 410 (e.g., via the fraud detection module 260) a computer model of the online concierge system 140 trained to detect a fraudulent behavior associated with an order placed with the online concierge system 140. The online concierge system 140 applies 415 the computer model to determine a score associated with the refund event, based on the information about the refund event received from the LLM. The information about the refund event may include information about one or more items associated with the refund event and a textual description of a reason for the refund event. The information about the one or more items associated with the refund event may include information about one or more features of each item of the one or more items.

The online concierge system 140 determines 420 (e.g., via the fraud detection module 260), based on the score, whether the refund event was due to a fraudulent behavior of the user. The online concierge system 140 performs 425 (e.g., via the fraud detection module 260 and/or the label update module 270) at least one action associated with the online concierge system 140, based on the determination whether the refund event was due to the fraudulent behavior. The online concierge system 140 may determine (e.g., via the fraud detection module 260), based on the score, that the refund event was due to the fraudulent behavior. The online concierge system 140 may suspend (e.g., via the fraud detection module 260) an account of the user at the online concierge system 140, based on the determination of the fraudulent behavior. The online concierge system 140 may determine (e.g., via the fraud detection module 260), based on the score, that the refund event was due to one or more items associated with the first order being OOS. The online concierge system 140 may update (e.g., via the label update module 270) one or more labels associated with the one or more items, based on the determination that the one or more items are OOS.

The online concierge system 140 may access (e.g., via the label update module 270) a second computer model of the online concierge system 140 trained to determine that an item is OOS. The online concierge system 140 may apply the second computer model to determine whether at least one item associated with the first order is OOS, based on the information about the refund event received from the LLM. The online concierge system 140 may update (e.g., via the label update module 270) at least one label associated with the at least one item, based on the determination that the at least one item is OOS as determined by the second computer model.

Embodiments of the present disclosure are directed to automatic detection of a fraudulent behavior at the online concierge system 140 in relation to a refund event. The online concierge system 140 utilizes the LLM to improve one or more features of an input into a computer model that is trained to determine a likelihood of a fraudulent behavior associated with the refund event. The improved computer model input features include an improved explanation of reasons for the refund event. An output of the computer model can be utilized for conducting appropriate actions associated with the online concierge system 140, such as suspension of a customer's account in case of the determined fraudulent behavior, and/or appropriate adjustment of labels of items associated with the refund event.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

requesting a language model of a model serving system in communication with the computer system to determine, based on a prompt input into the language model, information about a refund event for a first order placed with the computer system by a user of the computer system;

importing, from the model serving system and at a detection module of the computer system, the information about the refund event;

accessing, via the detection module, a machine-learning model of the computer system, wherein the machine-learning model is trained to detect a fraudulent behavior associated with an order placed with the computer system;

applying, via the detection module, the machine-learning model to the information about the refund event imported from the model serving system to generate a score associated with the refund event;

determining, by the detection module and using the score, whether the refund event was due to a fraudulent behavior of the user; and performing at least one action associated with the computer system, based on the determination whether the refund event was due to the fraudulent behavior.

2. The method of claim 1, further comprising:

generating the prompt for input into the language model, wherein generating the prompt comprises generating at least one of: a transcript of a conversation between a picker who fulfilled the first order and the user, a transcript of a conversation between a user service of the computer system and the user, a coded reason from the picker for the refund event, or a request for classification of a reason for the refund event.

3. The method of claim 1, further comprising:

generating the prompt for input into the language model, wherein generating the prompt comprises generating at least one of: an image of a receipt associated with the first order, or an optical character recognition version of the image of the receipt.

4. The method of claim 1, further comprising:

generating the prompt for input into the language model, wherein generating the prompt comprises generating at least one of: a transcript of a conversation between a picker who fulfilled the first order and the user, a transcript of a conversation between a user service of the computer system and the user, a coded reason from the picker for the refund event, a request for classification of a reason for the refund event, or an image of a receipt associated with the first order.

5. The method of claim 1, wherein the language model is a multi-modal language model configured to operate based on the prompt comprising textual data and image data.

6. The method of claim 1, wherein the information about the refund event comprises information about one or more items associated with the refund event and a textual description of a reason for the refund event.

7. The method of claim 6, wherein the information about the one or more items associated with the refund event comprises one or more features of each item of the one or more items.

8. The method of claim 1, further comprising:
determining, using the score, that the refund event was due to the fraudulent behavior; and
suspending an account of the user at the computer system, based on the determination of the fraudulent behavior.

9. The method of claim 1, further comprising:
determining, using the score, that the refund event was due to one or more items associated with the first order being out-of-stock (OOS); and
updating one or more labels associated with the one or more items, based on the determination that the one or more items are OOS.

10. The method of claim 1, further comprising:
accessing a second machine-learning model of the computer system, wherein the second machine-learning model is trained to determine that an item is out-of-stock (OOS); and
applying the second machine-learning model to the information about the refund event received from the language model to determine whether at least one item associated with the first order is OOS.

11. The method of claim 10, further comprising:
updating at least one label associated with the at least one item, based on the determination that the at least one item is OOS.

12. A computer program product comprising a non-transitory computer readable storage medium having instructions encoded thereon that, when executed by a processor, cause the processor to perform steps comprising:
requesting a language model of a model serving system in communication with a computer system to determine, based on a prompt input into the language model, information about a refund event for a first order placed with the computer system by a user of the computer system;
importing, from the model serving system and at a detection module of the computer system, the information about the refund event;
accessing, via the detection module, a machine-learning model of the computer system, wherein the machine-learning model is trained to detect a fraudulent behavior associated with an order placed with the computer system;
applying, via the detection module, the machine-learning model to the information about the refund event imported from the model serving system to generate a score associated with the refund event;
determining, by the detection module and using the score, whether the refund event was due to a fraudulent behavior of the user; and
performing at least one action associated with the computer system, based on the determination whether the refund event was due to the fraudulent behavior.

13. The computer program product of claim 12, wherein the instructions further cause the processor to perform steps comprising:
generating the prompt for input into the language model, wherein generating the prompt comprises generating at least one of: a transcript of a conversation between a picker who fulfilled the first order and the user, a transcript of a conversation between a user service of the computer system and the user, a coded reason from the picker for the refund event, or a request for classification of a reason for the refund event.

14. The computer program product of claim 12, wherein the instructions further cause the processor to perform steps comprising:
generating the prompt for input into the language model, wherein generating the prompt comprises generating at least one of: an image of a receipt associated with the first order, or an optical character recognition version of the image of the receipt.

15. The computer program product of claim 12, wherein the language model is a multi-modal language model configured to operate based on the prompt comprising textual data and image data.

16. The computer program product of claim 12, wherein the information about the refund event comprises information about one or more items associated with the refund event and a textual description of a reason for the refund event.

17. The computer program product of claim 12, wherein the instructions further cause the processor to perform steps comprising:
determining, using the score, that the refund event was due to the fraudulent behavior; and
suspending an account of the user at the computer system, based on the determination of the fraudulent behavior.

18. The computer program product of claim 12, wherein the instructions further cause the processor to perform steps comprising:
determining, using the score, that the refund event was due to one or more items associated with the first order being out-of-stock (OOS); and
updating one or more labels associated with the one or more items, based on the determination that the one or more items are OOS.

19. The computer program product of claim 12, wherein the instructions further cause the processor to perform steps comprising:
accessing a second machine-learning model of the computer system, wherein the second machine-learning model is trained to determine that an item is out-of-stock (OOS);
applying the second machine-learning model to the information about the refund event received from the language model to determine whether at least one item associated with the first order is OOS; and
updating at least one label associated with the at least one item, based on the determination that the at least one item is OOS.

20. A computer system comprising:
a processor; and
a non-transitory computer-readable storage medium having instructions that, when executed by the processor, cause the computer system to perform steps comprising:
requesting a language model of a model serving system in communication with the computer system to determine, based on a prompt input into the language model, information about a refund event for a first order placed with the computer system by a user of the computer system;

importing, from the model serving system and at a detection module of the computer system, the information about the refund event;

accessing, via the detection module, a machine-learning model of the computer system, wherein the machine-learning model is trained to detect a fraudulent behavior associated with an order placed with the computer system;

applying, via the detection module, the machine-learning model to the information about the refund event imported from the model serving system to generate a score associated with the refund event;

determining, by the detection module and using the score, whether the refund event was due to a fraudulent behavior of the user; and performing at least one action associated with the computer system, based on the determination whether the refund event was due to the fraudulent behavior.

\* \* \* \* \*